United States Patent
Yoganandan et al.

(10) Patent No.: US 11,216,149 B2
(45) Date of Patent: Jan. 4, 2022

(54) 360° VIDEO VIEWER CONTROL USING SMART DEVICE

(71) Applicant: Samsung Electronics Co., Ltd., Suwon-si (KR)

(72) Inventors: Arun Rakesh Yoganandan, San Francisco, CA (US); Yuchang Hu, Santa Clara, CA (US); Chang Long Zhu Jin, San Mateo, CA (US); Kristen Kator, San Mateo, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/355,438

(22) Filed: Mar. 15, 2019

(65) Prior Publication Data

US 2020/0293176 A1    Sep. 17, 2020

(51) Int. Cl.
*G06F 3/0481* (2013.01)
*G06F 3/0484* (2013.01)
(Continued)

(52) U.S. Cl.
CPC .......... *G06F 3/04815* (2013.01); *G06F 3/016* (2013.01); *G06F 3/04847* (2013.01); *G06F 3/04886* (2013.01)

(58) Field of Classification Search
CPC ............. G06F 3/04815; G06F 3/04886; G06F 3/04883; G06F 3/04847; G06F 2203/04802; G06F 3/04845; G06F 3/0488
See application file for complete search history.

(56) References Cited

U.S. PATENT DOCUMENTS 5,835,692 A * 11/1998 Cragun ................. G06T 19/20
                                                     345/419
9,600,078 B2    3/2017 Ratii
(Continued)

FOREIGN PATENT DOCUMENTS

CN          102799435 B      7/2012
CN          106028132 A      6/2016
(Continued)

OTHER PUBLICATIONS

Notification of Transmittal of the International Search Report and the Written Opinion of the International Searching Authority, or the Declaration dated Jan. 31, 2020 in connection with International Patent Application No. PCT/KR2019/008633, 12 pages.

*Primary Examiner* — Mong-Shune Chung

(57) ABSTRACT

An electronic device includes a touchscreen display and at least one processor. The at least one processor is configured to present a dynamic user interface on the touchscreen display. The dynamic user interface includes a first input region forming a dial. The first input region is configured to receive user input related to a first viewing direction associated with a 360° video. The at least one processor is also configured to detect the user input. In addition, the at least one processor is configured to transmit the user input to a display device to control presentation of the 360° video on the display device. The dynamic user interface may further include a second input region, where the second input region is configured to receive second user input related to a second viewing direction associated with the 360° video.

21 Claims, 13 Drawing Sheets

(51) Int. Cl.
    *G06F 3/0488*     (2013.01)
    *G06F 3/01*     (2006.01)

(56) References Cited

U.S. PATENT DOCUMENTS

| | | | |
|---|---|---|---|
| 2008/0129691 | A1 | 6/2008 | Armstrong |
| 2012/0044061 | A1* | 2/2012 | Sakai .................... G08C 17/00 340/12.5 |
| 2015/0363980 | A1* | 12/2015 | Dorta ...................... G06T 19/20 345/419 |
| 2016/0055676 | A1* | 2/2016 | Kasahara ............. G06T 19/006 345/633 |
| 2016/0077604 | A1* | 3/2016 | Youssef .................... B60S 1/38 345/157 |
| 2016/0098095 | A1 | 4/2016 | Gonzalez-Banos et al. |
| 2016/0259656 | A1 | 9/2016 | Sumner et al. |
| 2017/0139578 | A1* | 5/2017 | Dickerson ........... G06F 3/04815 |
| 2017/0169540 | A1 | 6/2017 | Satori et al. |
| 2018/0059899 | A1* | 3/2018 | Andersen ........... G06F 3/04883 |
| 2018/0122130 | A1 | 5/2018 | Kim et al. |
| 2018/0217709 | A1* | 8/2018 | Hotelling .............. G06F 3/0485 |
| 2018/0321493 | A1* | 11/2018 | Kim ..................... G02B 27/017 |
| 2019/0132523 | A1* | 5/2019 | Jang ...................... G06F 3/0482 |
| 2019/0187875 | A1* | 6/2019 | Kline ................... G06F 3/04883 |
| 2019/0340818 | A1* | 11/2019 | Furtwangler ........... G06F 1/163 |
| 2020/0236346 | A1* | 7/2020 | Kato ................... H04N 13/111 |

FOREIGN PATENT DOCUMENTS

| | | | | |
|---|---|---|---|---|
| KR | 10-2015-0063207 A | | 6/2015 | |
| KR | 1020180043098 | * | 4/2018 | ......... H04N 5/23216 |
| WO | 2010/022386 A2 | | 2/2010 | |

* cited by examiner

360° VIDEO VIEWER CONTROL USING SMART DEVICE

TECHNICAL FIELD

This disclosure relates generally to 360° video viewing and display systems. More specifically, this disclosure relates to a system and method for controlling 360° video to be displayed on a television or other monitor using a smart device.

BACKGROUND

In recent years, there has been a significant rise in the availability of 360° video content, primarily because of the proliferation of virtual reality (VR) displays. Currently, most 360° videos are presented in VR head mounted display (HMD) headsets. HMDs are often equipped with "three degrees of freedom" tracking that allows users to move their heads in any direction (up, down, left, right, and at any angle). The users can therefore view corresponding 360° video content at any angle. However, viewing 360° video content on a television or other fixed monitor is often difficult because the monitor is a static (non-moving) display. There is no easy and enjoyable way for a user to view 360° video content at different angles when the monitor is in a fixed position.

SUMMARY

This disclosure provides a system and method for controlling 360° video to be displayed on a television or other monitor using a mobile device.

In a first embodiment, an electronic device includes a touchscreen display and at least one processor. The at least one processor is configured to present a dynamic user interface on the touchscreen display. The dynamic user interface includes a first input region forming a dial. The first input region is configured to receive user input related to a first viewing direction associated with a 360° video. The at least one processor is also configured to detect the user input. In addition, the at least one processor is configured to transmit the user input to a display device to control presentation of the 360° video on the display device.

In a second embodiment, a display device includes a transceiver, a display, and at least one processor. The display is configured to present a 360° video. The at least one processor is configured to receive user input from a dynamic user interface on a touchscreen of an electronic device via the transceiver. The user input is related to a first viewing direction associated with the 360° video. The at least one processor is also configured to control presentation of the 360° video on the display based on the user input.

In a third embodiment, a method for controlling presentation of a 360° video by an electronic device on a display device includes displaying a dynamic user interface on a touchscreen display of the electronic device. The dynamic user interface includes a first input region forming a dial, and the first input region is configured to receive user input related to a first viewing direction associated with the 360° video. The method also includes detecting the user input. The method further includes transmitting the user input to the display device to control the presentation of the 360° video on the display device.

In a fourth embodiment, a method for presenting a 360° video on a display device includes receiving user input from a dynamic user interface displayed on a touchscreen of an electronic device. The user input is related to a viewing direction associated with the 360° video. The method also includes controlling presentation of the 360° video on the display device based on the user input.

In a fifth embodiment, a non-transitory computer readable medium contains instructions that when executed cause at least one processor to present a dynamic user interface on a touchscreen display. The dynamic user interface includes a first input region forming a dial, and the first input region is configured to receive user input related to a first viewing direction associated with a 360° video. The medium also contains instructions that when executed cause the at least one processor to detect the user input. The medium further contains instructions that when executed cause the at least one processor to transmit the user input to a display device to control presentation of the 360° video on the display device.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 15, discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged system.

Figure 1:
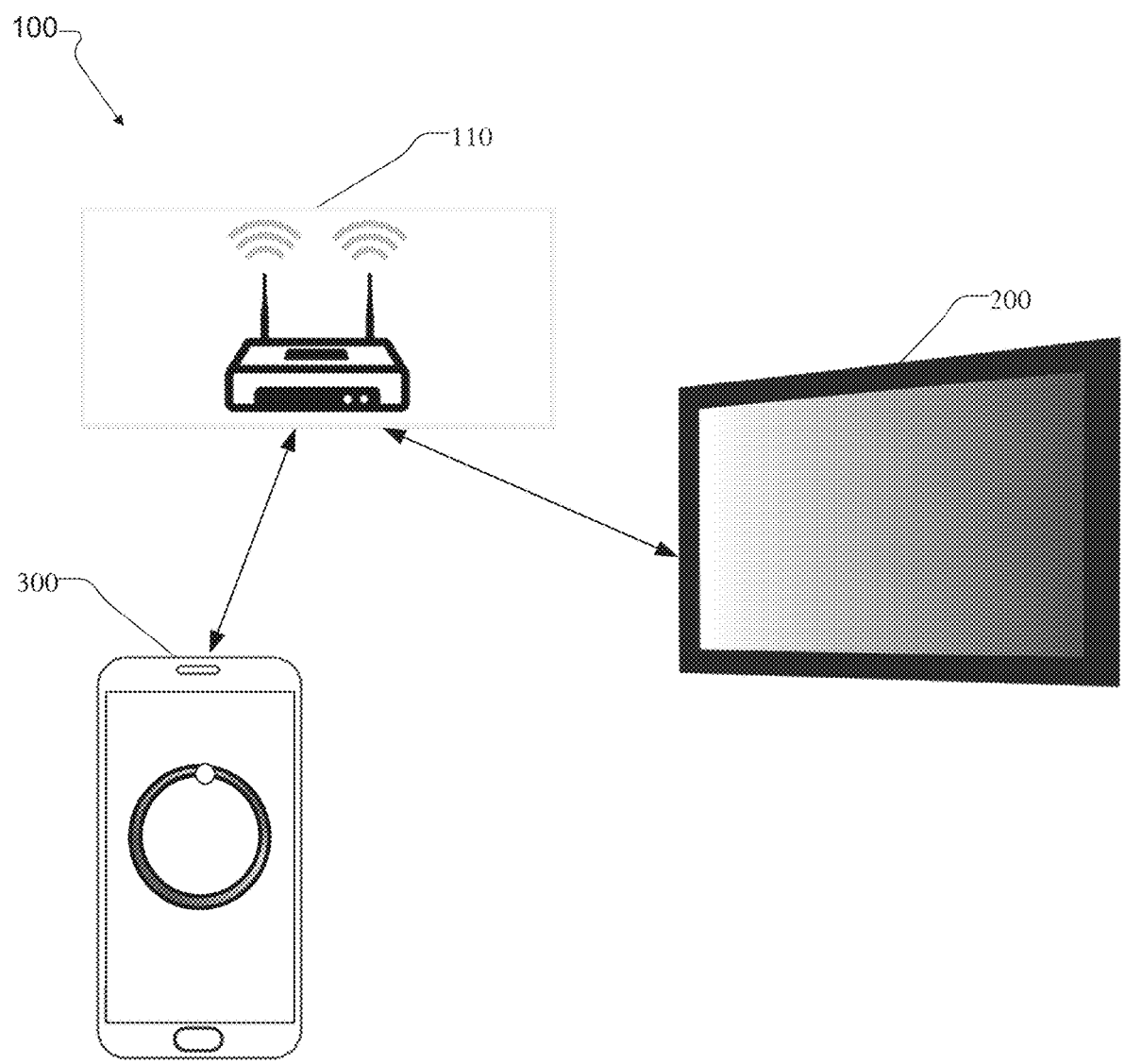
FIG. 1 illustrates an example system for controlling the presentation of a 360° video on a display device according to embodiments of this disclosure.

FIG. 1 illustrates an example system 100 for controlling the presentation of a 360° video on a display device according to embodiments of this disclosure. As shown in FIG. 1, according to embodiments of this disclosure, an electronic device 300 communicates with a display device 200 via a communication path 110, such as a wireless network.

The display device 200 includes a television or other monitor configured to present video content (including 360° video content) to one or more users. The display device 200 may also be associated with any number of electronic devices. For example, the display device 200 may be associated with a digital video disc (DVD) player, a TV box (such SAMSUNG HOMESYNC, APPLETV, or GOOGLE TV), a gaming console (such as an XBOX, PLAYSTATION, or NINTENDO), or any of the other types of electronic devices described above. The display device 200 or its associated electronic device(s) may communicate via one or more wireless access points, such as IEEE 802.11 wireless access points, or other networks. The display device 200 may communicate directly with the electronic device 300, such as by using WI-FI, BLUETOOTH, or any other short-range or other communication protocol(s).

The electronic device 300 is used as described in more detail below to control the presentation of 360° video content on the display device 200. The electronic device 300 may be, for example, a smartphone, a wearable device, or a tablet. The electronic device 300 may communicate via one or more wireless access points, such as IEEE 802.11 wireless access points, or other networks. The electronic device 300 may communicate directly with the display device 200, such as by using WI-FI, BLUETOOTH, any other short-range protocols, or other communication protocol(s) including cellular networks.

Although FIG. 1 illustrates one example of a system 100 for controlling the presentation of a 360° video on a display device, various changes may be made to FIG. 1. For example, the system 100 could include any number of each component in any suitable arrangement. Also, while FIG. 1 illustrates one operational environment in which various features disclosed in this patent document can be used, these features could be used in any other suitable system.

Figure 2:
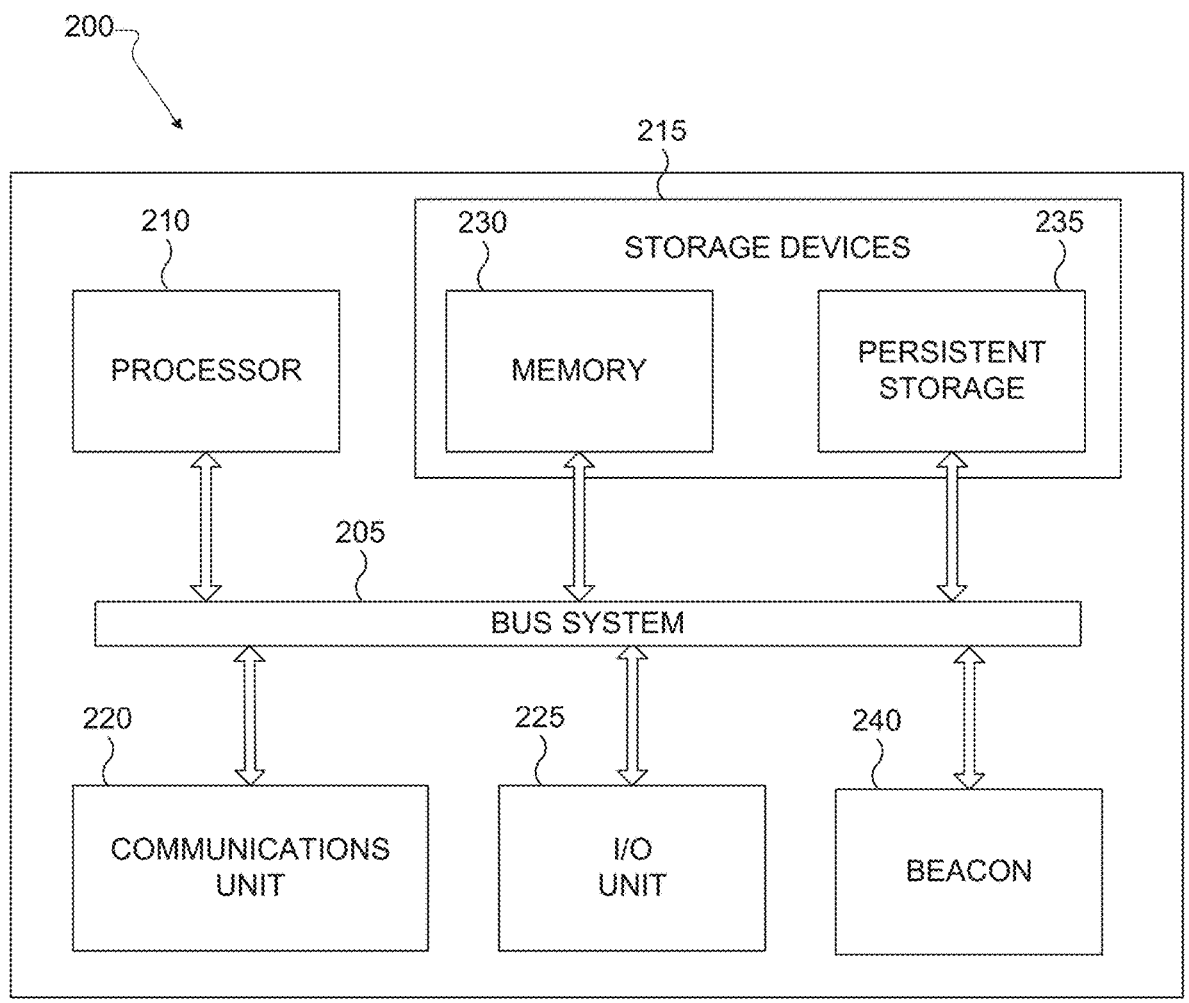
FIG. 2 illustrates an example display device according to embodiments of this disclosure.

FIG. 2 illustrates an example display device 200 according to embodiments of this disclosure. In particular, FIG. 2 illustrates example internal components that may be used in the display device 200, in addition to the actual display shown in FIG. 1. For ease of explanation, the display device 200 shown in FIG. 2 may be described as representing a television or other monitor in the system 100 of FIG. 1. However, the components shown in FIG. 2 could also be used in any suitable electronic device used in conjunction with a television or other monitor or other type of display device 200.

As shown in FIG. 2, the display device 200 includes a bus system 205, which supports communication between at least one processor 210, at least one storage device 215, and at least one communications unit 220. The processor 210 executes instructions that may be loaded into a memory 230. The processor 210 may include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a read-only memory, hard drive, flash memory, or optical disc. In some embodiments, the memory 230 stores at least one application that is used to control one or more functions of the display device 200.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

In some embodiments, the display device 200 may include an input/output (I/O) unit 225 that allows for input and output of data. For example, the I/O unit 225 may provide a connection for user input through a wireless remote, keyboard, mouse, keypad, touchscreen, or other suitable input device. The I/O unit 225 may also send output to a display or other suitable output device.

In some embodiments, a beacon 240 provides an indication to another device, such as the electronic device 300, that the display device 200 is present. The beacon 240 may support any suitable technology for providing signals to other devices. For example, the beacon 240 may include a radio frequency identification (RFID) device, an infrared beacon transmission device, a BLUETOOTH Low Energy (BLE) beacon, or other short-range or other communication device that signals to an electronic device 300 that the display device 200 is within a predetermined range of the electronic device 300. Note that in some embodiments, the beacon 240 may be part of the communications unit 220. For instance, the communications unit 220 may send out a beacon signal to indicate that the display device 200 is present, such as by using WI-FI, BLUETOOTH, or any short-range or other communication protocols.

As described in more detail below, the display device 200 may be controlled by the electronic device 300, which (among other things) can control the presentation of 360° video content by the display device 200. For example, the display device 200 may include at least one application that is executed by the processor 210, and the application can interact with the electronic device 300 to control the presentation of 360° video content by the display device 200. The application may also authenticate the electronic device 300 in order to control which electronic devices 300 can interact with the display device 200.

In some embodiments, any suitable electronic device 300 within proximity of the display device 200 may be allowed to configure the display device 200 and control the presentation of 360° video content by the display device 200. In other embodiments, only one or more specified electronic devices 300 may be allowed to configure the display device 200 and control the presentation of 360° video content by the display device 200. Depending on the implementation, communications between a display device 200 and an electronic device 300 may be encrypted.

Although FIG. 2 illustrates one example of a display device 200, various changes may be made to FIG. 2. For example, the display device 200 could include any number of each component shown in FIG. 2. Also, display devices 200 and electronic devices used with display devices 200 come in a wide variety of forms, and FIG. 2 does not limit this disclosure to any particular display device 200.

Figure 3:
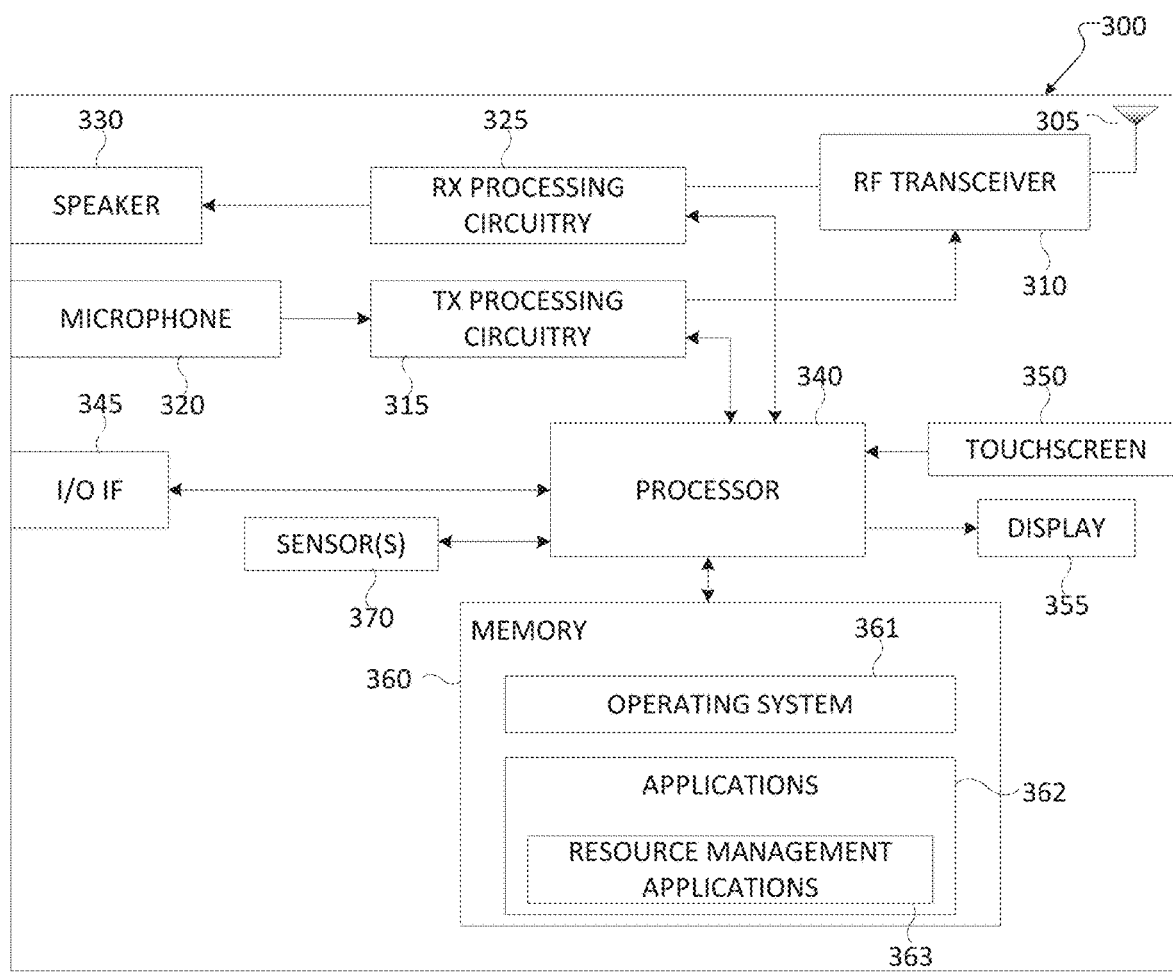
FIG. 3 illustrates an example electronic device according to embodiments of this disclosure.

FIG. 3 illustrates an example electronic device 300 according to embodiments of this disclosure. For ease of explanation, the electronic device 300 shown in FIG. 3 may be described as representing a smartphone in the system 100 of FIG. 1. However, the components shown in FIG. 3 could also be used in any suitable electronic device used in conjunction with a television or other monitor or other type of display device 200.

As shown in FIG. 3, the electronic device 300 includes an antenna 305 and a communication unit 310. The communication unit 310 may include, for example, a radio frequency (RF) transceiver, a BLUETOOTH transceiver, or a WI-FI transceiver. The electronic device 300 also includes transmit (TX) processing circuitry 315, a microphone 320, and receive (RX) processing circuitry 325. The electronic device 300 further includes a speaker 330, a processor 340, an I/O interface (IF) 345, an input 350, a display 355, and a memory 360. The memory 360 includes an operating system (OS) program 361 and one or more applications 362.

The communications unit 310 may receive an incoming RF signal, such as a BLUETOOTH or WI-FI signal. The communications unit 310 may down-convert the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data or 360° video control data).

The TX processing circuitry 315 receives analog or digital voice data from the microphone 320 or other outgoing baseband data (such as web data, e-mail, interactive video game, or 360° video control data) from the processor 340. The TX processing circuitry 315 encodes, multiplexes, and/or digitizes the outgoing baseband data to generate a processed baseband or IF signal. The communication unit 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the basic OS program 361 stored in the memory 360 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to incoming signals or user actions. The processor 340 is also coupled to the I/O interface 345, which provides the electronic device 300 with the ability to connect to other devices, such as laptop computers and handheld computers. The I/O interface 345 is the communication path between these accessories and the processor 340.

The processor 340 is also coupled to the input 350 and the display 355. The operator of the electronic device 300 can use the input 350 (such as a keypad, touchscreen, button, etc.) to enter data into the electronic device 300. The display 355 may be a liquid crystal display, a light-emitting diode (LED) display, an organic LED (OLED) display, an active matrix OLED (AMOLED) display, a transparent or opaque display (such one or more lenses on a pair of augmented reality glasses where one or more images maybe projected onto or displayed using the lenses), or other display capable of rendering text and/or at least limited graphics, such as from web sites. In some embodiments, the input 350 includes a touchscreen and may be combined into a single functional unit with the display 355. The touchscreen/display could include a touch panel, a (digital) pen sensor, a key, or an ultrasonic input device. The touchscreen/display could recognize, for example, a touch input in at least one scheme among a capacitive scheme, a pressure sensitive scheme, an infrared scheme, or an ultrasonic scheme. The touchscreen/display could also include a control circuit. In the capacitive scheme, the touchscreen could recognize touch or proximity.

The memory 360 is coupled to the processor 340. Part of the memory 360 could include a random access memory or other volatile memory, and another part of the memory 360 could include a flash memory, read-only memory, or other longer-term memory.

The electronic device 300 may further include one or more sensors 370 that can meter a physical quantity or detect an activation state of the electronic device 300 and convert metered or detected information into an electrical signal. For example, the sensor 370 may include one or more buttons for touch input, one or more cameras, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor (such as a Red Green Blue (RGB) sensor), a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an infrared (IR) sensor, an ultrasound sensor, an iris sensor, a fingerprint sensor, a haptic motor, etc. The sensor(s) 370 can further include a control circuit for controlling at least one of the sensors. Any of these sensor(s) 370 may be located within the electronic device 300, within a case configured to hold the electronic device 300, or in both the case and electronic device 300 (in embodiments where the electronic device 300 includes or is used with a case).

Although FIG. 3 illustrates one example of an electronic device 300, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the electronic device 300 configured as a mobile telephone or smartphone, electronic devices could be configured to operate as other types of mobile or stationary devices. In addition, electronic devices come in a wide variety of forms, and FIG. 3 does not limit this disclosure to any particular electronic device.

Figure 4:
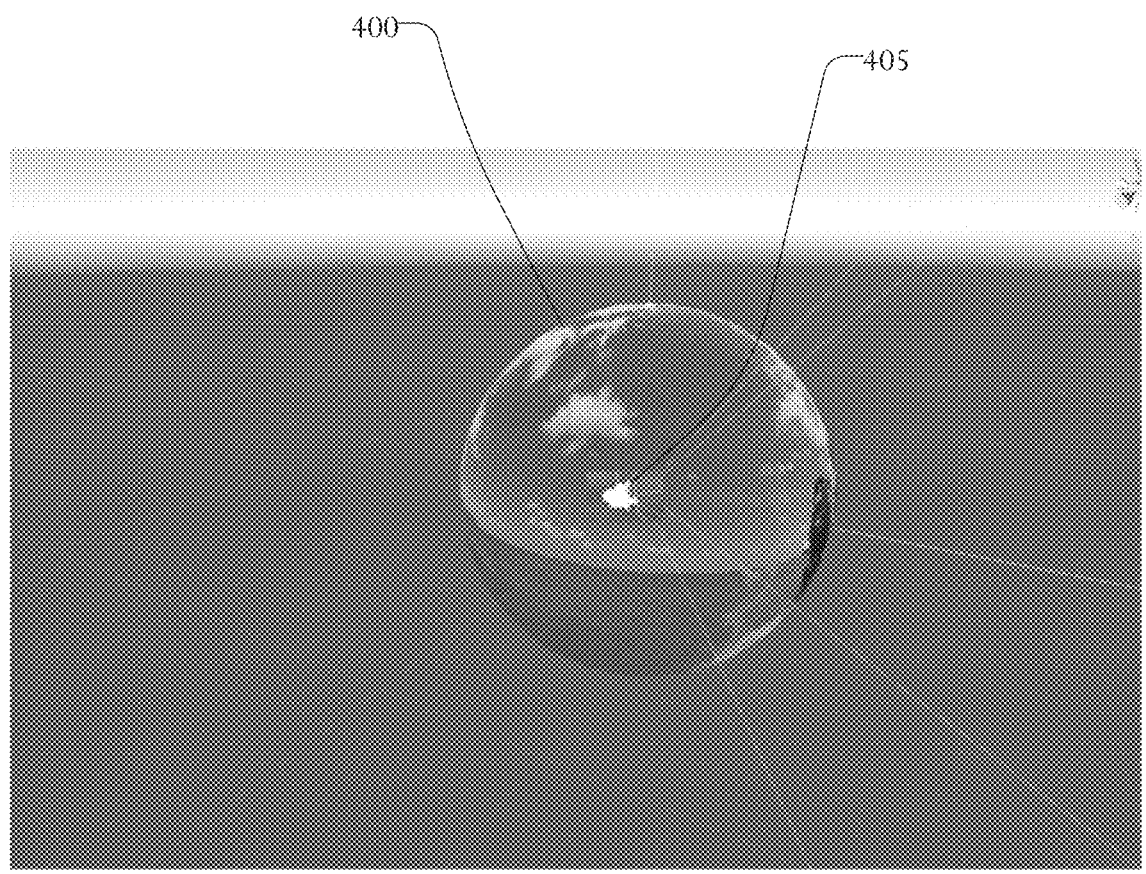
FIG. 4 illustrates an example of a 360° video applied as a texture to a sphere according to embodiments of this disclosure.

FIG. 4 illustrates an example of a 360° video applied as a texture to a sphere 400 according to embodiments of this disclosure. The display device 200, such as a TV or other monitor or an electronic device used with a TV or other monitor, may run an application to view 360° video content. The application may, for example, reside in at least one of the storage devices 215 and be executed by the processors 210.

To view 360° video content at different angles, the 360° video content can be mapped or applied as a texture to the sphere 400 as illustrated in FIG. 4. A virtual camera 405 is placed in the center of the sphere 400, and the virtual camera 405 rotates in response to user input. This allows a user to see a virtual world recreated by the sphere 400. According to embodiments of this disclosure, the display device 200 rotates the virtual camera 405 based on user inputs received from the electronic device 300 and updates the orientation of the virtual camera 405 based on the user inputs.

Although FIG. 4 illustrates one example of a 360° video applied as a texture to a sphere 400, various changes may be made to FIG. 4. For example, the specific 360° video content applied as a texture to the sphere 400 shown in FIG. 4 is for illustration only and merely meant to illustrate how a 360° video may be rendered by an application.

According to various embodiments of this disclosure, the electronic device 300 may store an application in its memory 360 and execute the application, using the processors 340, to control presentation of a 360° video on the display device 200. The display device 200 may also store an application in its memory and execute the application to receive messages from the electronic device 300 to control the presentation of the 360° video. For example, the application executed by the electronic device 300 may present a user interface on a touchscreen of the electronic device 300 to receive user inputs regarding directional movements. The application executed by the display device 200 could then receive the user inputs regarding the directional movements and adjust the presentation of the 360° video (such as by rotating the virtual camera 405 based on the user inputs).

Figure 5A:
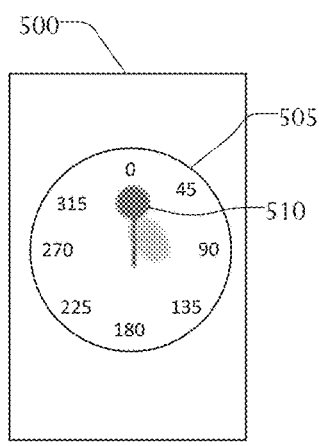
FIGS. 5A, 5B, 5C, 5D, 5E, and 5F illustrate examples of controlling the presentation of a 360° video using an electronic device while in an absolute mode according to embodiments of this disclosure.
Figure 5B:
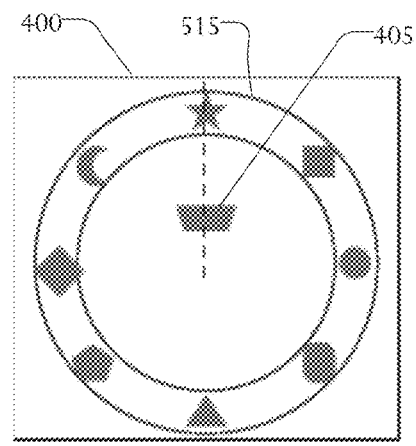
Figure 5C:
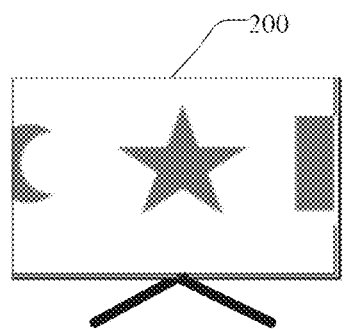
Figure 5D:
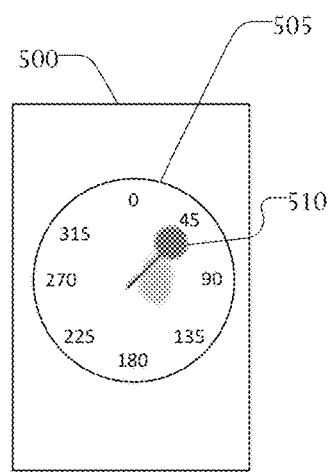
Figure 5E:
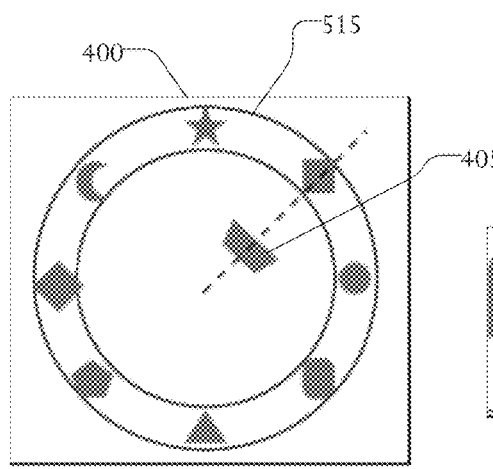
Figure 5F:
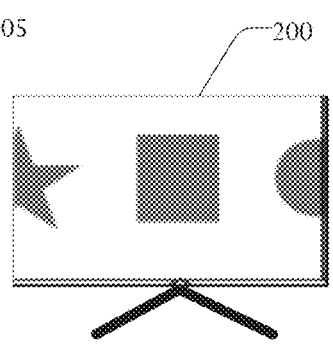

FIGS. 5A, 5B, 5C, 5D, 5E, and 5F illustrate examples of controlling the presentation of a 360° video using an electronic device 300 while in an absolute mode according to embodiments of this disclosure. In particular, FIGS. 5A and 5D illustrate an example of a user interface 500, FIGS. 5B and 5E illustrate a horizontal viewing plane 515 from the sphere 400 that has a 360° video applied as a texture, and FIGS. 5C and 5F illustrate an example of the display device 200 according to embodiments of this disclosure.

In some embodiments, the user interface 500 can be presented on a touchscreen display of the electronic device 300. The user interface 500 includes a circular dial 505 configured to receive input from a user related to a viewing direction. An application on the electronic device 300 can configure the user interface 500 to accept user input via the dial 505. When the user moves his or her finger around the dial 505, data is transmitted to the display device 200 to update the presentation of the 360° video. For example, if the user moves his or her finger to a particular angle on the circular dial 505, the angle can be transmitted to the display device 200 in order to update the viewing direction of the virtual camera 405. According to embodiments of this disclosure, a puck 510 or other symbol may be visible on the dial 505 to help guide the user regarding the movement of the virtual camera 405.

In the absolute mode, the angles defined in the circular dial 505 are fixed relative to the viewing directions of the virtual camera 405. If the user moves his or her finger on the dial 505 to a specific angle, the virtual camera 405 also rotates to that specific angle. For example, as illustrated in FIG. 5A, the puck 510 is positioned at 0°. The virtual camera 405 is therefore also positioned at 0° in a horizontal plane 515 of the sphere 400, viewing a star shape as illustrated in FIG. 5B. Accordingly, the display device 200 is presenting the user with a star shape as illustrated in FIG. 5C.

FIG. 5D illustrates movement of the user's finger along the dial 505 from 0° to 45°. The puck 510 may remain at rest in the dial 505 of the user interface 500 at 45° once the user removes his or her finger, since the angle of the dial 505 matches the viewing direction of the display device 200. FIG. 5E illustrates the virtual camera 405 also moving to 45° in response to the user input, and the virtual camera 405 is now viewing a square shape in the horizontal plane 515 of the sphere 400. As a result, FIG. 5F illustrates the display device 200 presenting the user with a square shape.

As can be seen here, the absolute mode allows a user to pick a specific direction for viewing 360° video content on the display device 200, regardless of the current viewing direction. Thus, in the absolute mode, changes to the viewing direction are made with reference to a fixed viewing direction. There are some instances when this type of control may be more intuitive, such as when the 360° video content is taken from the perspective of someone in a moving vehicle, aircraft, or other moving object. In these types of circumstances, the 0° angle may be associated with the forward direction of movement.

Although FIGS. 5A, 5B, 5C, 5D, 5E and 5F illustrate examples of controlling the presentation of a 360° video using an electronic device 300 while in an absolute mode, various changes may be made to FIGS. 5A, 5B, 5C, 5D, 5E and 5F. For example, the user interface, dial, puck, virtual camera, and display device shown here are for illustration only. Alternative input mechanisms other than the user's finger may also be used, for example, a stylus or S Pen. Obviously, the contents of the 360° video can vary in any suitable manner.

Figure 6A:
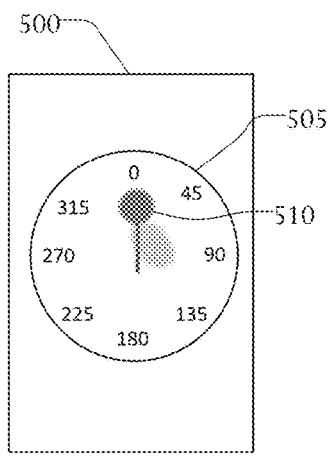
FIGS. 6A, 6B, 6C, 6D, 6E, and 6F illustrate examples of controlling the presentation of a 360° video using an electronic device while in a relative mode according to embodiments of this disclosure.
Figure 6B:
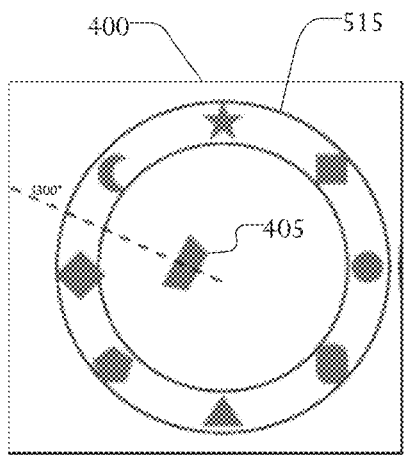
Figure 6C:
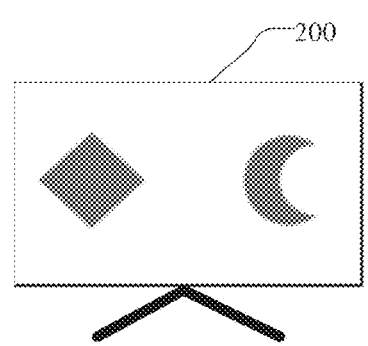
Figure 6D:
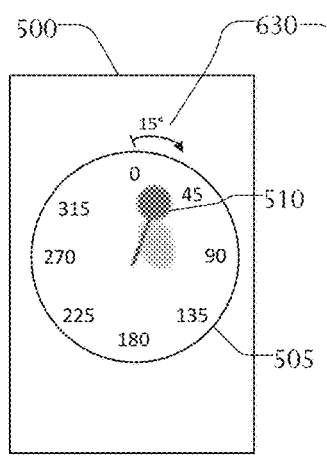
Figure 6E:
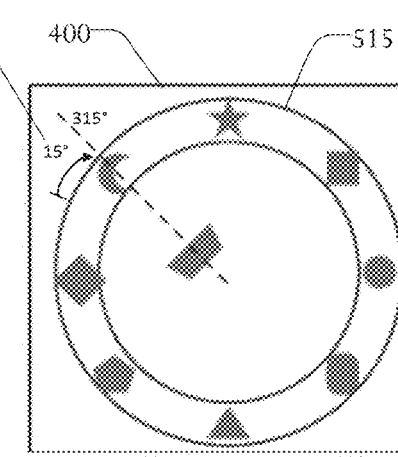
Figure 6F:
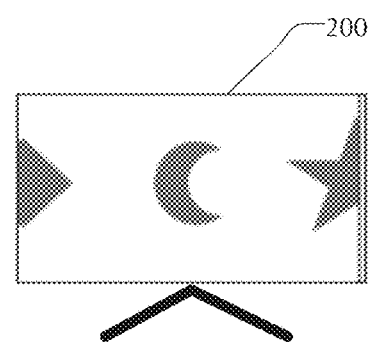

FIGS. 6A, 6B, 6C, 6D, 6E, and 6F illustrate examples of controlling the presentation of a 360° video using an electronic device while in a relative mode according to embodiments of this disclosure. In particular, FIGS. 6A and 6D illustrate an example of a user interface 500, FIGS. 6B and 6E illustrate a horizontal viewing plane 515 from the sphere 400 that has a 360° video applied as a texture, and FIGS. 6C and 6F illustrate an example of the display device 200.

When the application executed by the electronic device 300 is configured to operate in the relative mode, absolute directions of the puck 510 and the virtual camera 405 do not matter. Rather, the movements of the puck 510 with the user interface 500 result in relative movement with respect to the current viewing direction of the virtual camera 405. For example, as illustrated in FIG. 6A, the puck 510 of the user interface 500 is at 0° in the dial 505. However, the virtual camera 405 is positioned at a viewing angle of 300° in the horizontal plane 515 of the sphere 400 as illustrated in FIG. 6B. Accordingly, as illustrated in FIG. 6C, the display device 200 is presenting the user with an image of a diamond and crescent moon visible at the 300° viewing angle (not the star that is visible at the 0° viewing angle).

If the user moves the puck 510, the viewing angle of the virtual camera 405 changes based on the movement of the puck 510. For example, FIG. 6D illustrates the user moving his or her finger clockwise from 0° to 15° on the dial 505 of the user interface 500. This represents a 15° change in the viewing direction of the virtual camera 405, so the virtual camera 405 rotates clockwise from 300° to 315° as illustrated in FIG. 6E. Accordingly, as illustrated in FIG. 6F, the display device 200 presents the user with a crescent moon centered on the screen. According to embodiments of this disclosure, the absolute orientation of the puck 510 does not constraint the absolute orientation of the virtual camera 405 when in the relative mode. That is, the relative rotation of the puck 510 affects the rotation of the virtual camera 405. When in relative mode, as soon as the user releases the user's touch, the puck 510 can jump back to 0°, while the virtual camera 405 stays on the current viewing angle. The user can then make further adjustments to the viewing angle by moving the user's finger along the dial 505, with the puck 510 returning to 0° on the dial 505 whenever the user lifts his or her finger.

As can be seen here, the relative mode allows a user to change direction when viewing 360° video content on the display device 200 relative to the current viewing direction. There are some instances when this type of control may be more intuitive, such as when small adjustments to the viewing angle of the virtual camera 405 are more easily accomplished in relative mode. For example, to achieve a 135° rotation, the user can repeat smaller movements of three consecutive 45° rotations of the puck 510 to accrue 135° in total rotation of the virtual camera 405, which can be more ergonomically friendly than doing a 135° rotation with one finger movement.

Depending on the implementation, the electronic device 300 may support only the absolute mode or only the relative mode, or the electronic device 300 may allow selection of one of these modes. The user selection of a particular mode could be enforced for all videos, for certain types of videos, or on a per-video basis. There may also be times when the user selection of a particular mode could be overridden, such as based on the settings for a particular 360° video enforced by a content provider.

Although FIGS. 6A, 6B, 6C, 6D, 6E, and 6F illustrate examples of controlling the presentation of a 360° video using an electronic device while in a relative mode, various changes may be made to FIGS. 6A, 6B, 6C, 6D, 6E and 6F. For example, the user interface, dial, puck, virtual camera, and display device shown here are for illustration only. Obviously, the contents of the 360° video can vary in any suitable manner.

Figure 7A:
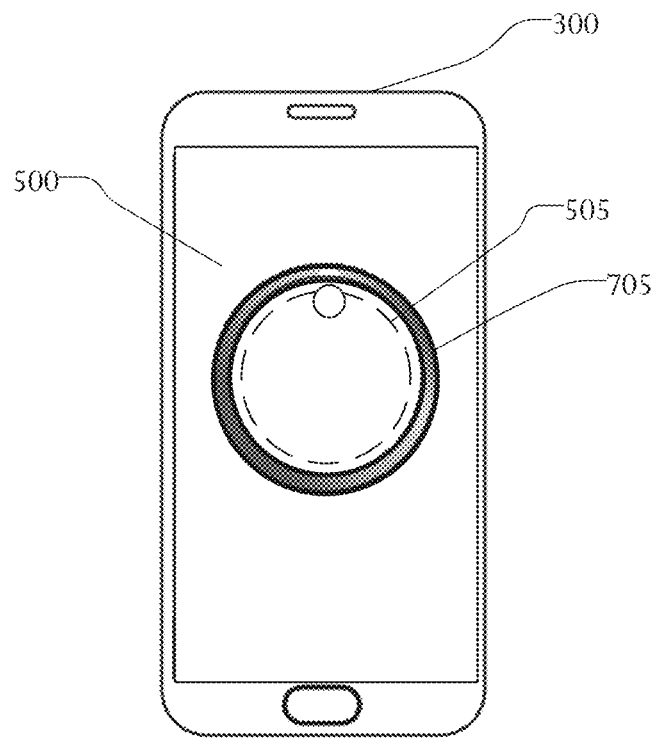
FIGS. 7A and 7B illustrate example dynamic user interfaces having a heat map as part of the user interface according to embodiments of this disclosure.
Figure 7B:
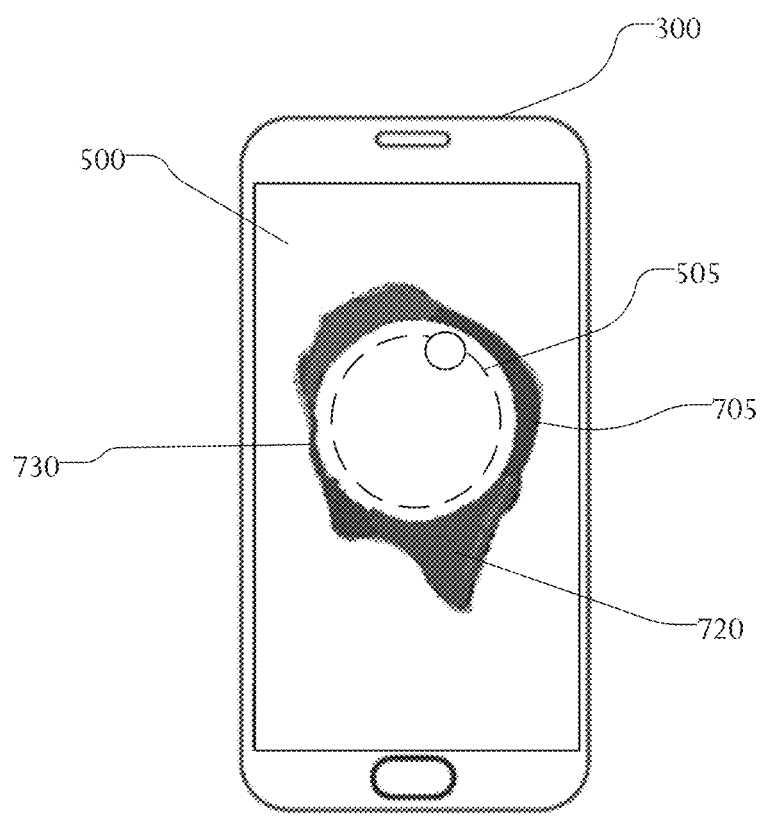

FIGS. 7A and 7B illustrate example dynamic user interfaces 500 having a heat map 705 as part of the user interface according to embodiments of this disclosure. In these examples, the user interfaces 500 are shown as being presented on a mobile smartphone, which represents one example of an electronic device 300. As shown in FIG. 7A, the user interface 500 includes the circular dial 505, and the circular dial 505 is surrounded by a dynamic heat map 705. The heat map 705 provides information identifying relative amounts of action or other desirable content taking place in the 360° video. For example, the heat map 705 may show brighter colors, which indicate a larger amount of action is occurring at one or more specified angles of the horizontal viewing plane 515 of the 360° video. Darker colors may also be displayed on the heat map 705, which indicate a smaller amount of action is occurring at one or more specified angles of the horizontal viewing plane 515 of the 360° video.

During use, a user can move the puck 510 around the dial 505 to correspond with areas of the heat map 705 that indicate more action is occurring. According to some embodiments of this disclosure, the heat map 705 is dynamic, so it can be constantly updated based on action taking place in the 360° video. Furthermore, the heat map 705 may be updated based on whether the application is running in absolute mode or relative mode.

As shown in FIG. 7B, another example of a dynamic heat map 705 surrounds the circular dial 505 as part of the user interface 500. Here, rather than having a uniform annular thickness as in FIG. 7A, the dynamic heat map 705 in FIG. 7B uses a non-uniform thickness to present an additional indication that action or other desirable content is taking place in one or more certain viewing directions. Thus, the action is not only represented by a color change in the heat map 705 but also by a thickness to the heat map's surface area. In this example, the dynamic heat map 705 has a thicker region 720 for angles 160°-180°, which corresponds with a larger amount of action taking place at those angles. The dynamic heat map 705 also has a thinner region 730 near angle 270°, which corresponds with a smaller amount of action taking place at that angle.

Although FIGS. 7A and 7B illustrate examples of dynamic user interfaces 500 having a heat map 705 as part of the user interface, various changes may be made to FIGS.

7A and 7B. For example, the user interface, dial, puck, and dynamic heat maps shown in FIGS. 7A and 7B are for illustration only.

Figure 8A:
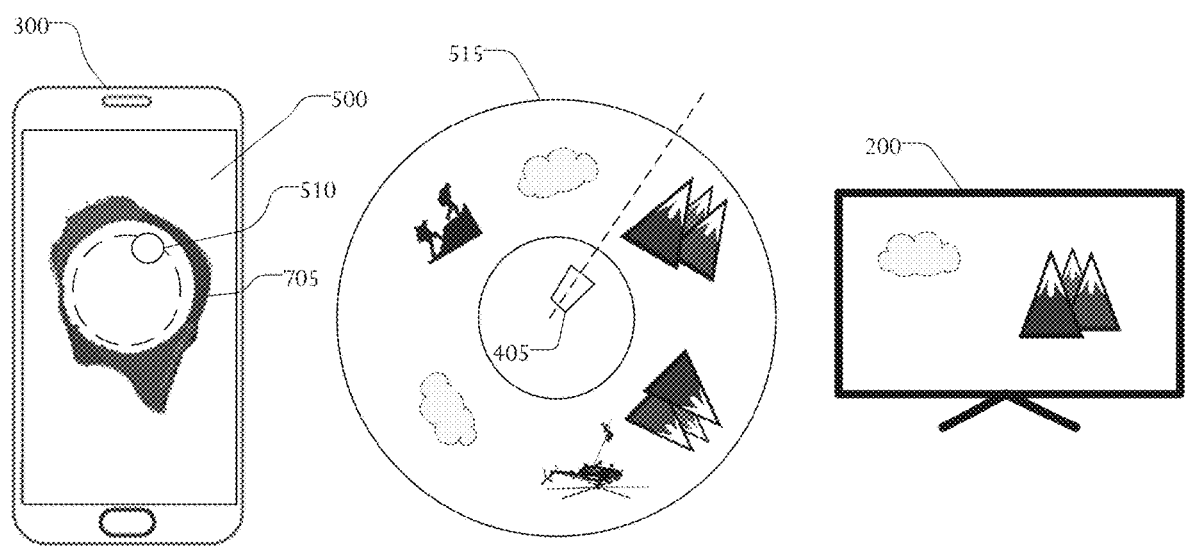
FIGS. 8A and 8B illustrate an example dynamic heat map indicating positions of action or other desired content in a 360° video according to embodiments of this disclosure.
Figure 8B:
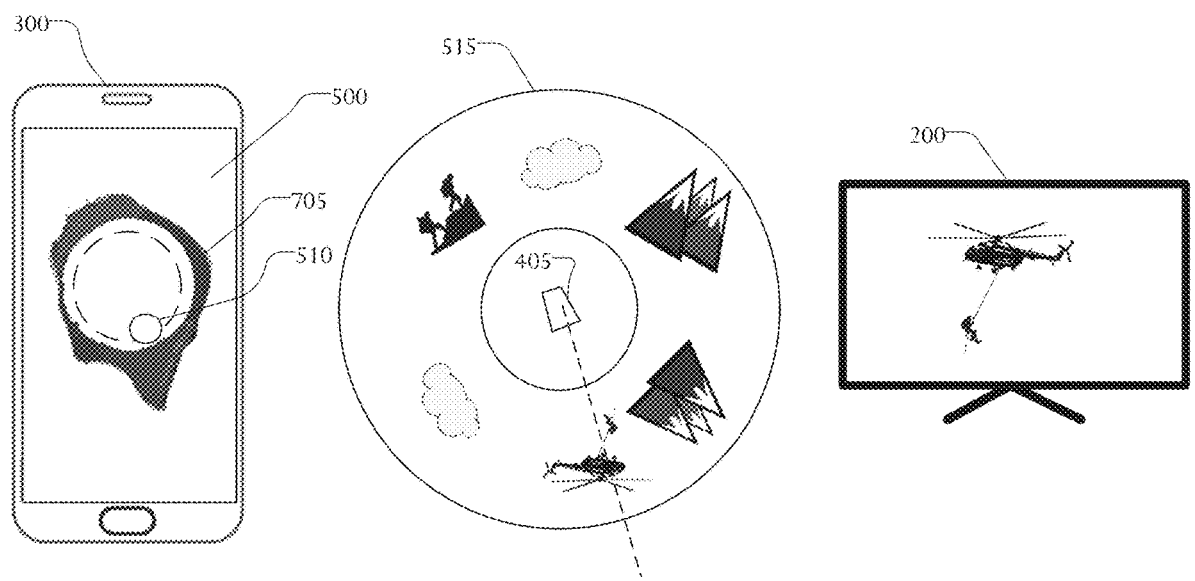

FIGS. 8A and 8B illustrate an example dynamic heat map 705 indicating positions of action or other desired content in a 360° video according to embodiments of this disclosure. In FIG. 8A, a first viewing position of a user watching a 360° video on the display device 200 is shown. Here, the user has interacted with the circular dial 505 of the user interface 500 by positioning the puck 510 at approximately 30°-45°. At this angle, the display device 200 presents the user with a calm view of mountains and clouds as seen by the virtual camera 405 in the horizontal viewing plane 515 of the sphere 400. However, the dynamic heat map 705 indicates the much more action is taking place between the angles of 160°-180°.

In FIG. 8B, a second viewing position of the user watching the 360° video on the display device 200 is shown. Here, the user had adjusted the virtual camera 405 by moving the user's finger along the dial 505, stopping the puck 510 at approximately 160°-180°. Here, the display device 200 presents the user with a high-action scene of a person being rescued by a helicopter as seen by the virtual camera 405 in the horizontal viewing plane 515 of the sphere 400. As can be seen here, the dynamic heat map 705 has been used by the user to view more desirable content within the 360° video.

In some embodiments, the dynamic heat maps 705 disclosed in this patent document may represent one of two types of heat maps. A first type of heat map 705 may be referred to as a "curated" heat map. A curated heat map refers to a heat map that is created by the creator or provider of a 360° video. This type of heat map allows the creator or provider of a 360° video to suggest viewing directions deemed to be interesting, such as based on narrative, action, or advertising or promotional purposes. A second type of heat map 705 may be referred to as a "statistical" or "crowd-sourced" heat map. A statistical heat map can be created by analyzing the viewing patterns of multiple users to see which viewing directions those users view more often. As more and more users watch a 360° video, their viewing directions can be tracked (such as on a per frame or per scene basis) to obtain statistical details of how many people viewed the video at different angles. This statistical data can be processed and reflected in real-time on the dynamic heat map 705. As users explore and discover interesting angles for each 360° video, those interesting directions gain strength in color or size, which are reflected by the dynamic heat map 705.

Although FIGS. 8A and 8B illustrate one example of a dynamic heat map 705 indicating positions of action or other desired content in a 360° video, various changes may be made to FIGS. 8A and 8B. For example, the user interface, dial, puck, and dynamic heat maps shown in FIGS. 8A and 8B are for illustration only.

In the above description, it has been assumed that the electronic device 300 is being used to change the viewing angle of a 360° video in a single plane (such as in the horizontal plane 515). However, it is possible to extend the functionality of the electronic device 300 to permit viewing angle changes in multiple planes.

Figure 9:
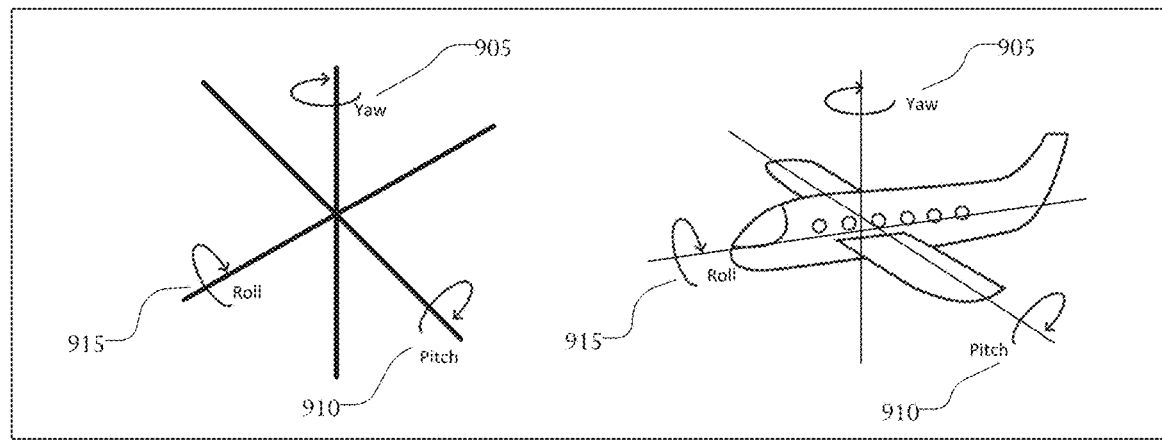
FIG. 9 illustrates three axes of rotation commonly referred to as yaw, pitch, and roll according to embodiments of this disclosure.

FIG. 9 illustrates three axes of rotation commonly referred to as yaw 905, pitch 910, and roll 915 according to embodiments of this disclosure. Yaw 905 is defined here as rotation about a first axis, which allows the virtual camera 405 to rotate left and right within a horizontal plane. Pitch 910 is defined here as rotation about a second axis, which allows the virtual camera 405 to look up and down or within a vertical plane. Roll 915 is defined here as rotation about a third axis, which allows the virtual camera 405 to tilt the horizon in a scene.

As explained above, the virtual camera 405 can be rotated based on user input via the circular dial 505 of the user interface 500. In FIG. 4, this permits rotation of the virtual camera 405 about the yaw axis. However, for certain 360° videos, it may be advantageous to be able to look in more than just horizontal directions. An example would be a 360° video of a drone flying over Niagara Falls. A user may want to be able to look up and down in the vertical plane (change the pitch 910), as well as left and right. Embodiments of this disclosure allow the user to control the virtual camera 405 to move both left and right (changes in yaw 905) and up and down (changes in pitch 910).

Changes in roll 915 when viewing a 360° video can be disorienting for users. Thus, some embodiments of this disclosure only allow for viewing angle changes in yaw 905 and pitch 910. Essentially, a user can use the electronic device 300 to look left, right, up, and down, but the user cannot roll the virtual camera 405. Of course, still other embodiments of this disclosure may permit rotations about all three axes.

Figures 10A, 10B:
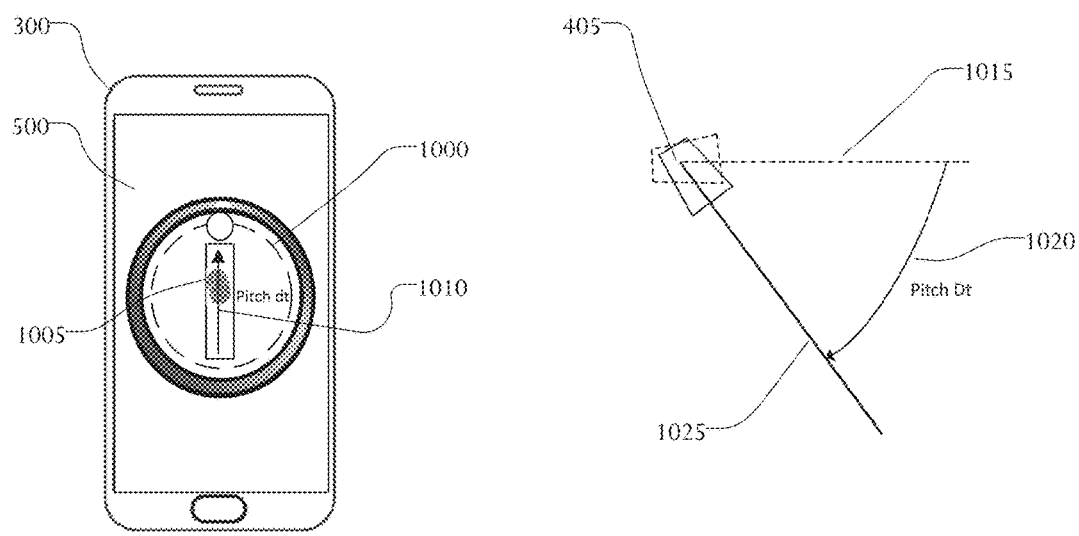
FIGS. 10A and 10B illustrate example directional control of pitch in a dynamic user interface according to embodiments of this disclosure.

FIGS. 10A and 10B illustrate example directional control of pitch in a dynamic user interface according to embodiments of this disclosure. In FIG. 10A, a yaw zone 1000 may represent the circular dial 505 described above, which can receive a first user input that allows changes in yaw 905. The circular dial 505 here includes a heat map, although any of the other heat maps discussed above could also be used here.

A second user input area, namely a pitch zone 1005, includes an area on the user interface that can receive a second user input allowing changes in pitch 910. Here, the pitch zone 1005 is rectangular and allows a user to move his or her finger in a straight line up and down, allowing changes in the pitch 910. For example, the user's finger can move from the bottom of the pitch zone 1005 to the top of the pitch zone 1005 in order to move the virtual camera 405 to face downward. Similarly, the user's finger can move from the top of the pitch zone 1005 to the bottom of the pitch zone 1005 in order to move the virtual camera 405 to face upward.

In some embodiments, the yaw zone 1000 and the pitch zone 1005 may be used in a mutually exclusive manner. That is, the user may make changes in the yaw zone 1000 or the pitch zone 1005 (but not both) at any given time. This may help to prevent changes from yaw from affecting the pitch or vice versa. Also, in some embodiments, the pitch zone 1005 could be smaller and fit clearly within the circular dial 505 when not in use. When the pitch zone 1005 is selected, the pitch zone 1005 could be enlarged (possibly covering part of the circular dial 505) in order to allow finer adjustments to be made to the pitch 910. However, the yaw zone 1000 and the pitch zone 1005 could be implemented in any other suitable manner. For instance, the pitch zone 1005 could be positioned outside the circular dial 505.

In FIG. 10B, example movement of the virtual camera 405 in response to user input in the pitch zone 1005 of the user interface 500 is shown. For example, the virtual camera 405 can start at a viewing angle of 0° with respect to an axis 1015. The user swipes the user's finger upward in the pitch zone 1005 as illustrated in FIG. 10A. The change in angle (Pitch Dt) 1020 the camera moves downward in FIG. 10B is proportional to the change in distance (Pitch dt) 1010 in FIG. 10A. This causes the camera 405 to obtain a new viewing direction 1025.

Although FIGS. 10A and 10B illustrate one example of directional control of pitch in a dynamic user interface, various changes may be made to FIGS. 10A and 10B. For example, the location of the pitch zone 1010 is for illustration only. Also, the pitch zone 1010 may be configured to receive input in various ways and need not receive straight motions.

Figure 11A:
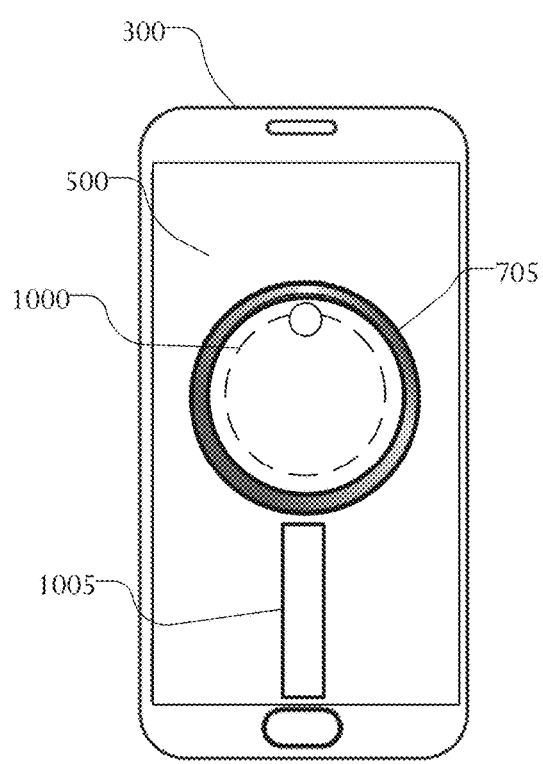
FIGS. 11A and 11B illustrate additional example dynamic user interfaces according to embodiments of this disclosure.
Figure 11B:
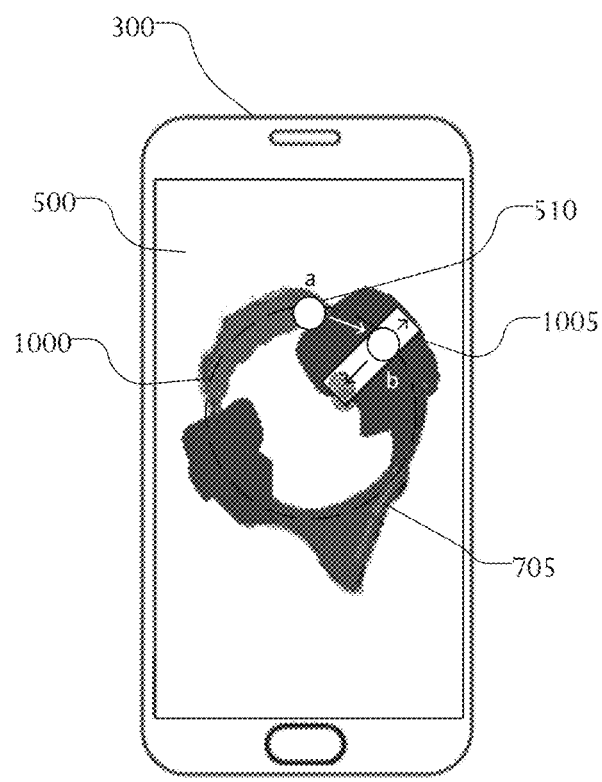

FIGS. 11A and 11B illustrate additional example dynamic user interfaces 500 according to embodiments of this disclosure. In FIG. 11A, the yaw zone 1000 is shown as including a circular dial 505 and puck 510 as discussed above. The yaw zone 1000 is also surrounded by a dynamic heat map 705. In this example, the pitch zone 1005 is situated below the yaw zone 1000 and the heat map 705.

In FIG. 11B, the yaw zone 1000 is again shown as including a circular dial 505 and puck 510 as discussed above. In this example, the yaw zone 1000 overlays the dynamic heat map 705. In this example, the pitch zone 1005 can be dynamically updated and adjusted in location within the dynamic heat map 705. For example, as illustrated in FIG. 11B, the heat map has an increased width at approximately 45°. The pitch zone 1005 is dynamically placed in this wide portion of the heat map to control the virtual camera 405. As the heat map 705 changes in width, the pitch zone 1005 can be moved accordingly. In this example, the user has two degrees of freedom. That is, the user may move his or her finger around the dial to adjust the yaw as shown when the puck 510 moves from position a to position b. The user can also move his or her finger radially in the pitch zone 1005 to control the view in the vertical plane. For example, when the user slides his or her finger to the peak of the heat map, the virtual camera 405 can be directed at the epicenter of the action with respect to both pitch and yaw.

Although FIGS. 11A and 11B illustrate additional examples of dynamic user interfaces, various changes may be made to FIGS. 11A and 11B. For example, the yaw zone 1000 and pitch zone 1005 could dynamically appear and disappear when not in use. As another example, the pitch zone 1005 could start out small and dynamically expand to full size when touched. In addition, the user interface, yaw zone, pitch zone, and heat maps shown in FIGS. 11A and 11B are for illustration only.

Figure 12A:
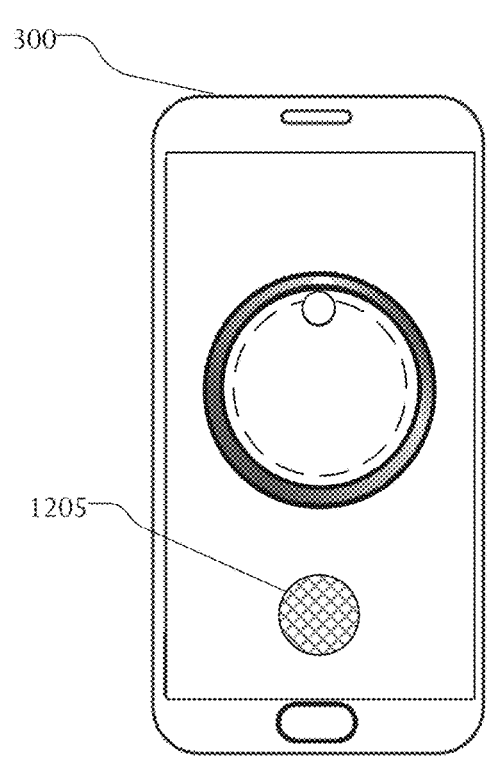
FIGS. 12A, 12B, and 12C illustrate an example use of one or more haptic motors to identify position of movement in a 360° video according to embodiments of this disclosure.
Figure 12B:
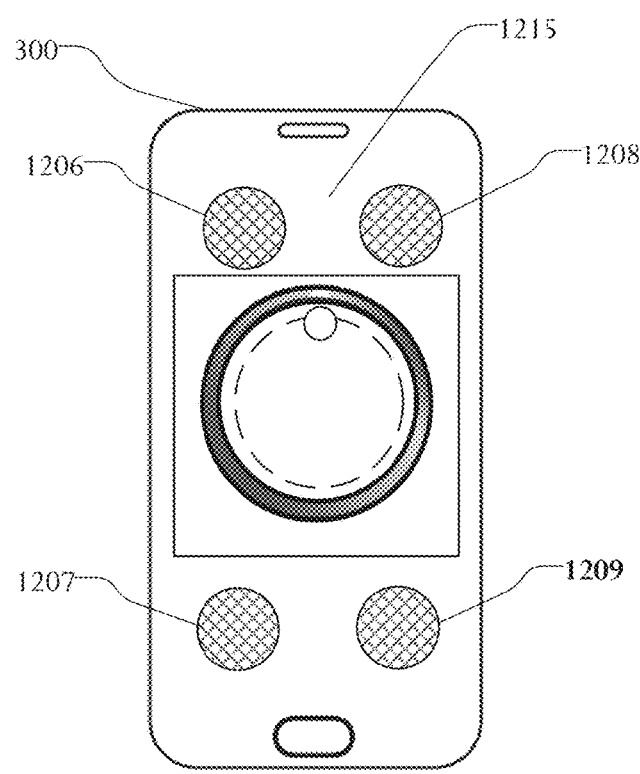
Figure 12C:
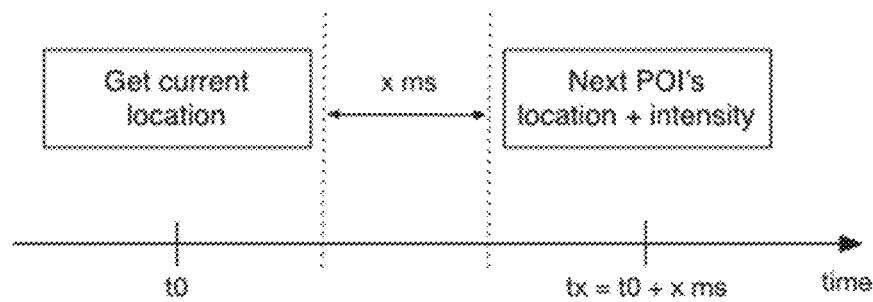

FIGS. 12A, 12B, and 12C illustrate an example use of one or more haptic motors to identify position of movement in a 360° video according to embodiments of this disclosure. As shown in FIG. 12A, according to some embodiments of this disclosure, a haptic motor 1205 may be used in conjunction with the dynamic heat map 705 or independently to alert a user about a position of action or other desired content in a 360° video. For example, the application running on the electronic device 300 may be configured to engage the haptic motor 1205 of the electronic device 300 in various ways to indicate position of action. As particular examples, the application may engage the haptic motor 1205 to provide a feedback alert when the user aligns with a direction of desirable content. The application may engage the haptic motor 1205 to alert the user of an upcoming event related to the 360° video. In this way, the user can know to focus the user's attention on the heat map of the user interface 500 to adjust positions at specific times. The application may further redirect the user based on a plurality of vibration patterns emitted by the haptic motor 1205.

In some cases, the application may vary the haptic characteristics in various ways (such as intensity, duration, and pattern) to signal different types of positions of interest, priority levels of the positions, or proximity in time or space of the positions of interest. For example, the intensity of driving the haptic motor 1205 may be low (indicating a low priority position of interest or view count) or high (indicating a high priority position of interest or view count). While one haptic motor 1205 is shown here, the electronic device 300 could be configured to contain a plurality of haptic motors 1205. The plurality of vibrations may indicate direction (such as left, right, up, and down) or rotation (such as clockwise or counterclockwise). In this way, a user may be notified using various vibrations in the electronic device 300, instead of needing to look away from the display device 200 at the heat map 705 for interesting positions of activity.

In FIG. 12B, a case 1215 (such as a sleeve) is shown for the electronic device 300 and contains a plurality of haptic motors 1206-1209. The application on the electronic device 300 can be configured to communicate with the haptic motors 1206-1209 located in the case 1215, such as via a suitable interface of the electronic device 300 or via wireless communication. The application could cause the haptic motors 1206-1209 to engage based on positions of interest in the 360° video. For example, the placement of the haptic motors in the case 1215 could indicate which direction the user should redirect the virtual camera 405 when an alert occurs. Again, the application may vary the haptic characteristics of the haptic motors 1206-1209 (such as sequence, intensity, duration, and pattern) to provide different information to the user.

In FIG. 12C, an example process is shown to redirect or alert a user with at least one haptic motor. In order to alert or redirect the user, an understanding of the future heat map may be used. That is, the application on the electronic device 300 can know how the heat map is going to vary in the future in order to operate the at least one haptic motor. In this example, if the 360° video's position in time is $t_0$, the system may predict and adjust an alert to a time $t_x$ as illustrated in FIG. 12C.

Although FIGS. 12A, 12B, and 12C illustrate one example use of one or more haptic motors to identify position of movement in a 360° video, various changes may be made to FIGS. 12A, 12B, and 12C. For example, the electronic device 300 and case 1215 may have any suitable number of haptic motors arranged in any suitable position(s).

Figure 13:
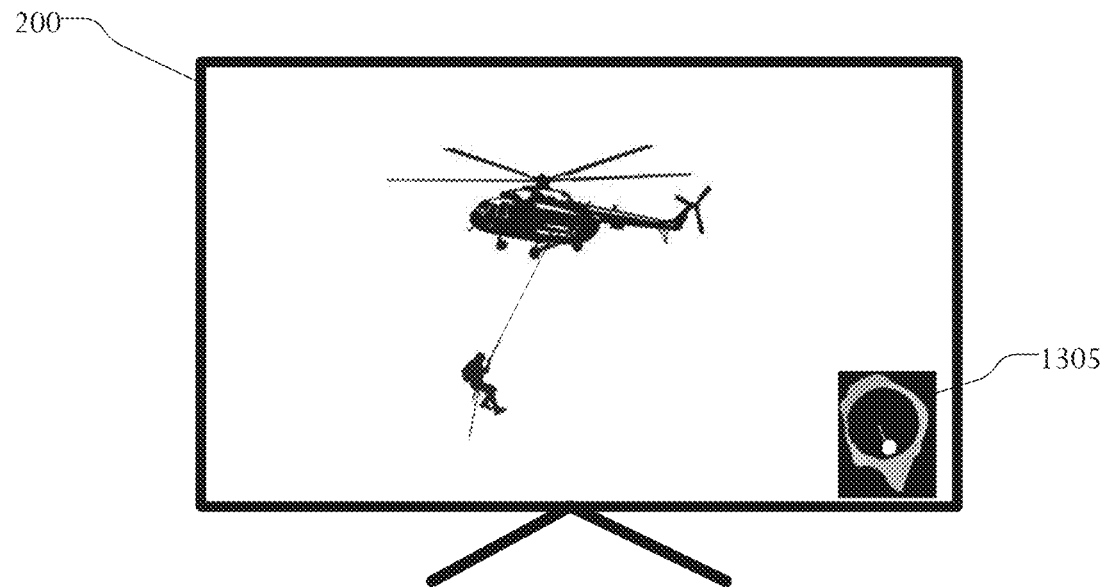
FIG. 13 illustrates an example symbol on a display device that reflects a dynamic user interface according to embodiments of this disclosure.

FIG. 13 illustrates an example symbol 1305 on a display device 200 that reflects a dynamic user interface according to embodiments of this disclosure. Another way to alert a user of various positions of interest in a 360° video (instead of or in addition to haptic feedback) involves presenting the symbol 1305 on the display device 200.

The application running on the display device 200 may present a user with the symbol 1305, which may include part or all of the user interface 500 presented on the electronic device 300. Here, the symbol 1305 may include the heat map information showing various points of interest in the 360° video. The symbol 1305 may also include a puck 510 indicating an absolute position of the virtual camera 405. The symbol 1305 may further include various forms of the yaw zone 1000 and/or pitch zone 1005. Note, however, that the contents of the symbol 1305 can vary as needed or desired.

Also note that the symbol 1305 may be configured to be presented in different locations within the display screen of the display device 200. For example, the symbol 1305 could be placed in a location outside where the 360° video is being displayed. The symbol 1305 could also be moved to account for changing locations of action within the 360° video. It is further possible for the symbol 1305 to be presented temporarily, such as when the symbol 1305 disappears after the user has moved to a desirable viewing direction.

Although FIG. 13 illustrates one example of a symbol 1305 on a display device 200 that reflects a dynamic user interface, various changes may be made to FIG. 13. For example, the symbol 1305 may contain various pieces of the user interface or may look entirely different from the user interface while still indicating various positions of interest in the 360° video. Also, the display device 200 and the symbol 1305 shown in FIG. 13 are for illustration only.

Figure 14:
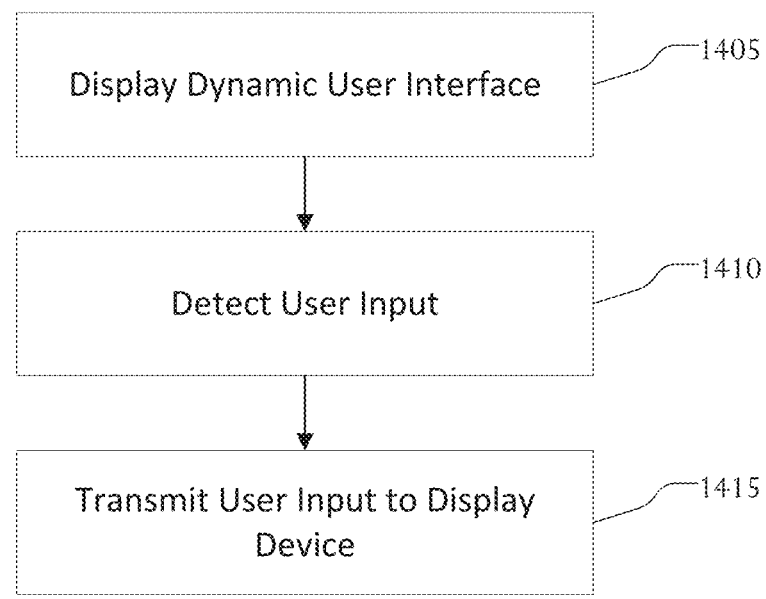
FIG. 14 illustrates an example method for controlling presentation of a 360° video on a display device according to embodiments of this disclosure.

FIG. 14 illustrates an example method for controlling presentation of a 360° video on a display device according to embodiments of this disclosure. The process depicted in FIG. 14 can be implemented by at least one processor in, for example, the electronic device 300. In block 1405, the electronic device 300 displays a dynamic user interface 500 on a touchscreen display. The dynamic user interface 500 is configured to receive user input related to viewing directions. In block 1410, the electronic device 300 detects user input from the dynamic user interface 500. In block 1415, the electronic device 300 transmits the user input to the display device 200 to control presentation of the 360° video on the display device 200. Note that the user input here could relate to a viewing direction in a single plane or in multiple planes.

Figure 15:
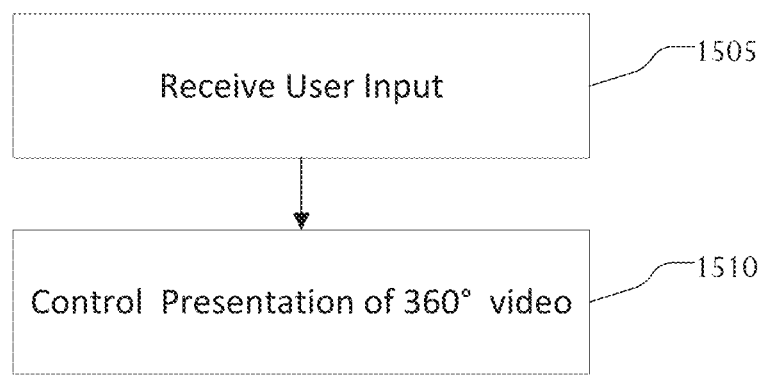
FIG. 15 illustrates an example method for presenting a 360° video on a display device according to embodiments of this disclosure.

FIG. 15 illustrates process for presenting a 360° video on a display device according to embodiments of this disclosure. The process depicted in FIG. 15 can be implemented by at least one processor in, for example, the display device 200. In block 1505, the display device 200 receives user input from the user interface 500 on the touchscreen of the electronic device 300. The user input relates to a viewing direction associated with the 360° video. In block 1510, the display device 200 controls the presentation of the 360° video on the display based on the user input. Again, note that the user input here could relate to a viewing direction in a single plane or in multiple planes.

Although FIGS. 14 and 15 illustrate example methods for controlling presentation of a 360° video on a display device and for presenting a 360° video on a display device, various changes may be made to FIGS. 14 and 15. For example, while shown as a series of steps, various steps in each figure could overlap, occur in parallel, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. An electronic device comprising:
a touchscreen display; and
at least one processor configured to:
in response to a first user input, select a mode of operation for a second user input from an absolute mode or a relative mode;
present a dynamic user interface on the touchscreen display, the dynamic user interface comprising a first input region forming a dial, the first input region configured to receive user input related to a first viewing direction associated with a 360° video, the 360° video comprising images textured on an inner surface of a sphere;
detect the second user input; and
transmit the second user input to a second display device to control, based on the second user input and the selected mode of operation, presentation of the 360° video on the second display device.

2. The electronic device of claim 1, wherein:
the dynamic user interface further comprises a dynamic heat map; and
the dynamic heat map indicates at least one position of desired content in the 360° video.

3. The electronic device of claim 1, wherein:
in the absolute mode, changes to the first viewing direction are made with reference to a fixed viewing direction; and
in the relative mode, changes to the first viewing direction are made with reference to a current viewing direction.

4. The electronic device of claim 1, wherein:
the dynamic user interface further comprises a second input region, the second input region configured to receive a third user input related to a second viewing direction associated with the 360° video; and
the at least one processor is further configured to:
detect the third user input; and
transmit the third user input to the second display device to further control the presentation of the 360° video on the second display device.

5. The electronic device of claim 1, further comprising at least one haptic motor,
wherein the at least one processor is further configured to control the at least one haptic motor based on a position of desired content in the 360° video.

6. The electronic device of claim 1, wherein the second display device comprises a static display configured to not move such that the second display device is in a fixed position.

7. A display device comprising:
a transceiver;
a second display configured to present a 360° video, the second display disposed in a fixed position in a viewing space, the 360° video comprising images textured on an inner surface of a sphere; and
at least one processor configured to:
receive a second user input from a dynamic user interface on a touchscreen of an electronic device via the transceiver, the second user input related to a first viewing direction associated with the 360° video; and
control, based on the second user input and a mode of operation for the second user input selected from an absolute mode and a relative mode, presentation of the 360° video on the second display based on the second user input, wherein the mode of operation is selected based on a first user input.

8. The display device of claim 7, wherein the at least one processor is further configured to present, on the second display, one or more symbols identifying at least one position of desired content in the 360° video relative to a current viewing direction associated with the 360° video.

9. The display device of claim 7, wherein:
in the absolute mode, changes to the first viewing direction are made with reference to a fixed viewing direction; and
in the relative mode, changes to the first viewing direction are made with reference to a current viewing direction.

10. The display device of claim 7, wherein the second user input comprises information relating to the first viewing direction associated with the 360° video and a second viewing direction associated with the 360° video.

11. A method for controlling presentation of a 360° video on a second display device, the method comprising:

in response to a first user input, selecting a mode of operation for a second user input from an absolute mode or a relative mode;

displaying a dynamic user interface on a touchscreen display of an electronic device, the dynamic user interface comprising a first input region forming a dial, the first input region configured to receive user input related to a first viewing direction associated with the 360° video, the 360° video comprising images textured on an inner surface of a sphere;

detecting the second user input; and transmitting the second user input to the second display device to control, based on the second user input and the selected mode of operation, the presentation of the 360° video on the second display device.

12. The method of claim 11, wherein:

the dynamic user interface further comprises a dynamic heat map; and the dynamic heat map indicates at least one position of desired content in the 360° video.

13. The method of claim 12, wherein the dynamic heat map is based on at least one of:

information from a creator or provider of the 360° video identifying the at least one position of desired content in the 360° video; or information identifying viewing directions commonly used by multiple users when viewing the 360° video.

14. The method of claim 11, wherein:

the dynamic user interface further comprises a second input region, the second input region configured to receive a third user input related to a second viewing direction associated with the 360° video; and the method further comprises:

detecting the third user input; and transmitting the third user input to the second display device to further control the presentation of the 360° video on the second display device.

15. The method of claim 14, wherein:

the second input region comprises a bar within the dial;

the dial of the first input region allows a user to alter a current viewing direction about a first axis; and the bar of the second input region allows the user to alter the current viewing direction about a second axis.

16. A method for presenting a 360° video on a display device, the method comprising:

receiving a second user input from a dynamic user interface displayed on a touchscreen of an electronic device, the second user input related to a viewing direction associated with the 360° video, the 360° video comprises images textured on an inner surface of a sphere; and controlling, based on the second user input and a mode of operation for the second user input selected from an absolute mode and a relative mode, presentation of the 360° video on the display device based on the second user input, wherein the mode of operation is selected based on a first user input, and wherein the display device is fixed in a viewing space.

17. A non-transitory computer readable medium containing instructions that when executed by at least one processor of an electronic device cause the at least one processor to:

in response to a first user input, select a mode of operation for a second user input from an absolute mode or a relative mode;

present a dynamic user interface on a touchscreen display, the dynamic user interface comprising a first input region forming a dial, the first input region configured to receive user input related to a first viewing direction associated with a 360° video, the 360° video comprises images textured on an inner surface of a sphere;

detect the second user input; and transmit the second user input to a second display device to control, based on the second user input and the selected mode of operation, presentation of the 360° video on the second display device, wherein the second display device is fixed in a viewing space.

18. The non-transitory computer readable medium of claim 17, wherein:

the dynamic user interface further comprises a dynamic heat map; and the dynamic heat map indicates at least one position of desired content in the 360° video.

19. The non-transitory computer readable medium of claim 17, wherein:

in the absolute mode, changes to the first viewing direction are made with reference to a fixed viewing direction; and in the relative mode, changes to the first viewing direction are made with reference to a current viewing direction.

20. The non-transitory computer readable medium of claim 17, wherein:

the dynamic user interface further comprises a second input region, the second input region configured to receive a third user input related to a second viewing direction associated with the 360° video; and the instructions when executed further cause the at least one processor to:

detect the third user input; and transmit the third user input to the second display device to further control the presentation of the 360° video on the second display device.

21. The non-transitory computer readable medium of claim 17, wherein the instructions when executed further cause the at least one processor to control at least one haptic motor based on a position of desired content in the 360° video.

* * * * *